(12) United States Patent
Semper et al.

(10) Patent No.: US 8,837,441 B2
(45) Date of Patent: Sep. 16, 2014

(54) VERSATILE SYSTEM FOR WLAN/CDMA2000 INTERWORKING

(75) Inventors: William Joseph Semper, Richardson, TX (US); Purva R. Rajkotia, Plano, TX (US); Sanjaykumar Kodali, Plano, TX (US)

(73) Assignee: Samsung Electronics Co., Ltd., Suwon-si (KR)

( * ) Notice: Subject to any disclaimer, the term of this patent is extended or adjusted under 35 U.S.C. 154(b) by 1523 days.

(21) Appl. No.: 11/391,099

(22) Filed: Mar. 28, 2006

(65) Prior Publication Data

US 2007/0230409 A1    Oct. 4, 2007

(51) Int. Cl.
| | |
|---|---|
| *H04L 12/26* | (2006.01) |
| *H04L 12/28* | (2006.01) |
| *H04W 36/00* | (2009.01) |
| *H04W 92/02* | (2009.01) |
| *H04W 88/12* | (2009.01) |
| *H04W 84/12* | (2009.01) |
| *H04W 84/04* | (2009.01) |
| *H04W 60/04* | (2009.01) |

(52) U.S. Cl.
CPC .............. *H04W 92/02* (2013.01); *H04W 88/12* (2013.01); *H04W 84/12* (2013.01); *H04W 84/042* (2013.01); *H04W 60/04* (2013.01)
USPC ............ 370/338; 370/236; 370/401; 455/444

(58) Field of Classification Search
USPC ......... 370/352–356, 338, 401, 466, 467, 236, 370/331; 455/436–438, 435.1, 439, 444, 455/450, 329, 331
See application file for complete search history.

(56) References Cited

U.S. PATENT DOCUMENTS

| | | | |
|---|---|---|---|
| 7,515,909 B2* | 4/2009 | Jain et al. ...................... 455/436 |
| 7,720,487 B2* | 5/2010 | Kim et al. .................... 455/456.1 |
| 2002/0085516 A1* | 7/2002 | Bridgelall ...................... 370/329 |
| 2003/0134650 A1* | 7/2003 | Sundar et al. ................. 455/465 |
| 2003/0157942 A1* | 8/2003 | Osmo ........................... 455/456 |
| 2004/0114553 A1* | 6/2004 | Jiang et al. .................... 370/328 |
| 2004/0146021 A1* | 7/2004 | Fors et al. ...................... 370/331 |
| 2005/0083846 A1* | 4/2005 | Bahl .............................. 370/236 |
| 2005/0119001 A1* | 6/2005 | Watanabe ...................... 455/436 |
| 2006/0209799 A1* | 9/2006 | Gallagher et al. ............. 370/352 |
| 2006/0223503 A1* | 10/2006 | Muhonen et al. ........... 455/414.1 |

* cited by examiner

*Primary Examiner* — Nizar Sivji (57) ABSTRACT

A system for providing architecture and signaling, by which a mobile communications device—active within a WLAN environment—may be effectively and efficiently interfaced with a CDMA2000 network to provide cooperative and concurrent VoIP and over-the-air (OTA) communications, is disclosed. A wireless communications system comprises a mobile station, operating in a wireless LAN environment. The mobile station access the Internet through a wireless LAN access point. The area is also provided service by a CDMA2000-based over-the-air network. A provisioning server, within the CDMA2000-based network, is accessible via the Internet. A mobile switching center is also within the CDMA2000-based network. An interface construct is communicatively coupled to the mobile switching center and to the wireless LAN, and is adapted to facilitate call traffic between the CDMA2000 network and the mobile station over the wireless LAN.

20 Claims, 11 Drawing Sheets

| FIG. 7-1 |
|----------|
| FIG. 7-2 |

FIG. 9

| FIG. 9-1 |
|----------|
| FIG. 9-2 |

| | | |
|---|---|---|
| = [1111] (IF EVEN NUMBER OF DIGITS) IDENTITY DIGIT N+3 = [0H-9H] (IF ODD NUMBER OF DIGITS) | IDENTITY DIGIT N+2 = [0H-9H] (BCD) | n+1 |
| ⇒ MOBILE IDENTITY (ESN): ELEMENT IDENTIFIER = [0DH] — 904 | | 1 |
| LENGTH = [05H] | | 2 |
| ODD/EVEN INDICATOR = [0] | TYPE OF IDENTITY = [101] (ESN) | 3 |
| IDENTITY DIGIT 1 = [0000] | | 4 |
| ESN = <ANY VALUE> (MSB) | | 5 |
| | | 6 |
| | (LSB) | 7 |
| ⇒ MOBILE IDENTITY (MEID): ELEMENT IDENTIFIER = [04H] — 906 | | 1 |
| LENGTH = [08H] | | 2 |
| ODD/EVEN INDICATOR = '0' | TYPE OF IDENTITY = [001] (MEID) | 3 |
| MEID HEX DIGIT 1 = [0H-FH] | MEID HEX DIGIT 2 = [0H-FH] | 4 |
| MEID HEX DIGIT 3 = [0H-FH] | MEID HEX DIGIT 4 = [0H-FH] | 5 |
| MEID HEX DIGIT 5 = [0H-FH] | MEID HEX DIGIT 6 = [0H-FH] | 6 |
| MEID HEX DIGIT 7 = [0H-FH] | MEID HEX DIGIT 8 = [0H-FH] | 7 |
| MEID HEX DIGIT 9 = [0H-FH] | MEID HEX DIGIT 10 = [0H-FH] | 8 |
| MEID HEX DIGIT 11 = [0H-FH] | MEID HEX DIGIT 12 = [0H-FH] | 9 |
| MEID HEX DIGIT 13 = [0H-FH] | MEID HEX DIGIT 14 = [0H-FH] | 10 |
| FILL = [FH] | | |
| ⇒ VOCODERS SUPPORTED: ELEMENT IDENTIFIER = [08H] — 914 | | 1 |
| LENGTH = <VARIABLE> | | 2 |
| ... | | ... |
| RTP PAYLOAD TYPE = [05H = (PCMU), 08H = (PCMA), 0CH = (13K VOCODER), 60H = (EVRC), 61H = (EVRCS), 62H = (SMV1), 63H = (SMV0)]; | | m |

VERSATILE SYSTEM FOR WLAN/CDMA2000 INTERWORKING

TECHNICAL FIELD OF THE INVENTION

The present application relates generally to wireless communication devices and, more specifically, to apparatus and methods for facilitating the interworking of a mobile communications device, based within a wireless LAN (WLAN) environment, in a CDMA2000 network.

BACKGROUND OF THE INVENTION

As so-called "Wi-Fi" networks and other WLAN technologies (e.g., IEEE 802.11, Bluetooth) increase in popularity, it is reasonable to assume that wireless operators and customers will demand communications devices that can operate in both a WLAN network and a CDMA2000 network, although not usually simultaneously.

Hybrid wireless devices—capable of functioning in both a WLAN environment and larger CDMA2000 networks—are now appearing in the market. As wireless technology continues to evolve and become ever more ubiquitous, interworking between different wireless networks may become a standard feature on mobile communication devices (e.g., mobile phones).

"Landline" telephone providers began losing market share to mobile phone providers when customers realized that they could use their mobile phones to replace landline phones in their homes and offices. As the emergence and utilization of home/office WLANs continues to grow, it seems likely that wireless carriers may eventually lose market share to operators capable of providing cheap call services using voice-over-IP (VoIP) in a home/office WLAN. Consumers may be able to place voice calls over the Internet at a much more affordable rate than using conventional CDMA2000 wireless networks.

Unfortunately, however, conventional systems appear to make no provision for the compatible interworking of a hybrid device between WLAN-type systems and CDMA2000 networks. It appears that existing hybrid devices—although capable of operating in both environments—are currently limited to either a WLAN-type operational mode or a CDMA2000 operational mode.

As a result, there is a need for a system that provides both an architecture and operational scheme for interworking of a mobile communications device between a WLAN environment and a CDMA2000 network, in an easy, efficient and cost-effective manner.

SUMMARY OF THE INVENTION

A versatile system, comprising various apparatus and methods, provides an operational scheme by which a mobile communications device—active within a WLAN environment—may be effectively and efficiently interfaced with a CDMA2000 network to provide cooperative and concurrent VoIP and over-the-air (OTA) communications.

Specifically, the system of the present disclosure provides an interface construct. The interface construct is operationally accessible to a mobile communications device, operating within a WLAN environment, via an IP-based network (e.g., the Internet). The interface construct is also operationally accessible to a wireless network utilizing a CDMA2000 (3G1x) air interface. The interface construct functions as a surrogate base station through which the WLAN-based mobile device accesses the CDMA2000 network, and relays and translates necessary communications there between.

Before undertaking the DETAILED DESCRIPTION OF THE INVENTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the terms or "construct" or "component" may mean any device, system or part thereof that performs a processing, control or communication operation; and such a device may be implemented in hardware, firmware or software, or some combination of at least two of the same. It should be noted that the functionality associated with any particular construct or component may be centralized or distributed, whether locally or remotely. Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION OF THE INVENTION

FIGS. 1-10, discussed below, and the various embodiments used to describe the principles of the present disclosure in this patent document are by way of illustration only, and should not be construed in any way to limit the scope of the disclosure. Hereinafter, certain aspects of the present disclosure are described in relation to illustrative embodiments and operations of mobile communications devices, WLAN technologies, and OTA networks. Those skilled in the art, however, will understand that the principles and teachings of the present disclosure may be implemented in a variety of suitably arranged mobile communications devices or systems—regardless of the specific form factor, location, or functionality of that device or system.

The following discloses a versatile system—comprising various apparatus and methods—for effectively and efficiently interfacing a mobile communications device—active within a WLAN environment—with a CDMA2000 network to provide cooperative and concurrent VoIP and over-the-air (OTA) communications. The system of the present disclosure provides an interface construct that is operationally accessible to the mobile communications device via an IP-based network (e.g., the Internet). The interface construct is also operationally accessible to a wireless network utilizing a CDMA2000 (3G1x) air interface. The interface construct functions as a surrogate base station through which the WLAN-based mobile device accesses the CDMA2000 network, and relays and translates necessary communications therebetween.

For purposes of explanation and illustration, the present system is described in relation to a mobile device that is capable of supporting both the CDMA2000 (i.e., 3G1x) air interface and an unlicensed WLAN air interface (e.g., 802.11b, Bluetooth). For seamless handovers as the mobile migrates from the WLAN environment to the CDMA2000 network, the WLAN must be overlaid with a 3G1x cell, although this is not necessary to initiate voice service over the WLAN, as describe hereinafter. Given the ubiquitous nature of CDMA2000, however, this will usually not be a concern.

Figure 1:
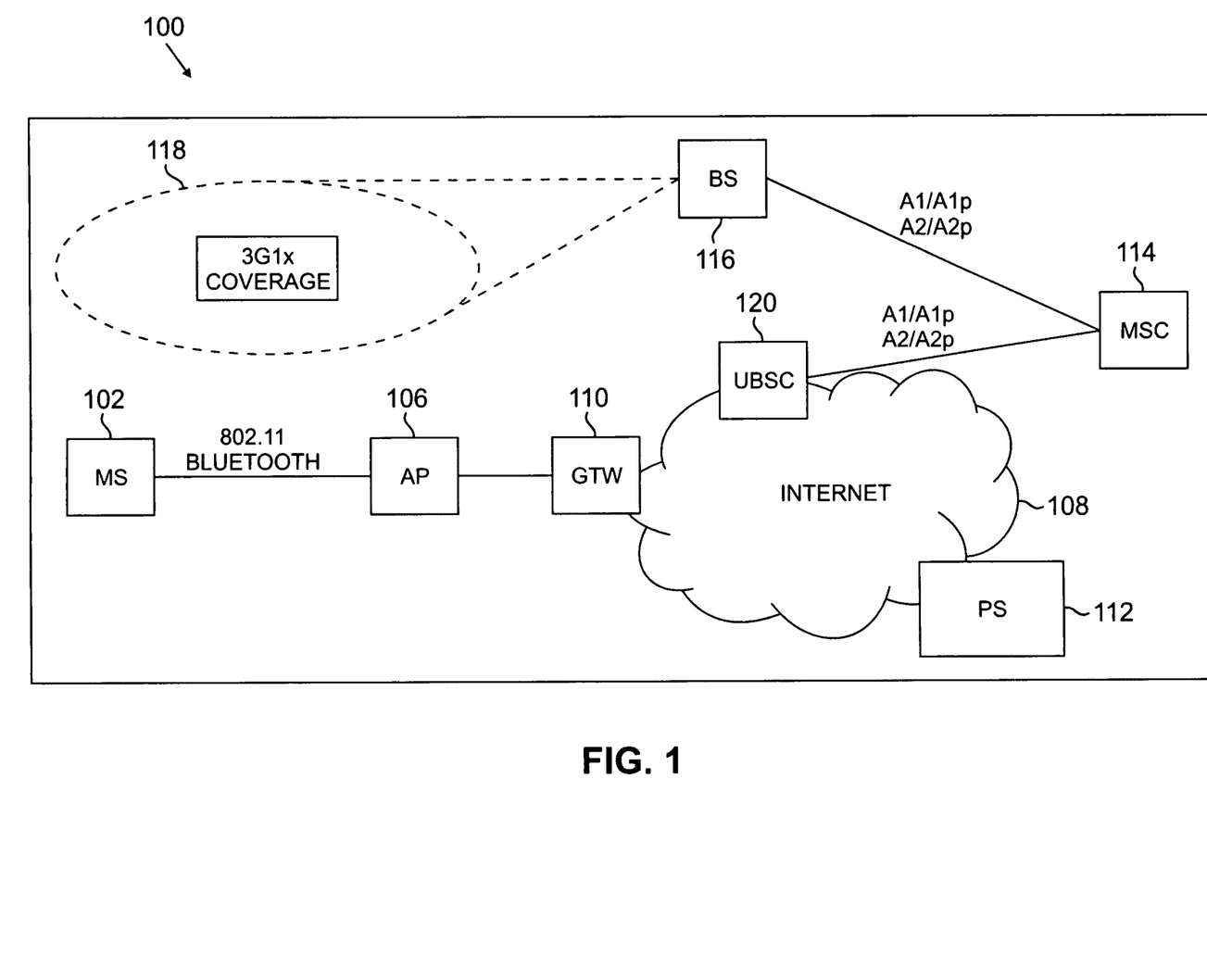
FIG. 1 depicts one embodiment of a mobile communications systems according to certain aspects of the present disclosure.

Certain aspects of the present system are illustrated in greater detail with reference now to FIG. 1, which provides a block diagram depiction of a communications system 100. Within system 100, a mobile station (MS) 102 has access to an unlicensed WLAN network 104 (e.g., 802.11, Bluetooth) that is provided through an access point 106 (AP). AP 106 may be connected to a local broadband provider's network, and may access the Internet 108 through a gateway 110 (GTW).

A provisioning server 112 (PS) is an Internet-accessible server that is within a 3G1x service provider's home network. MS 102 is programmed with a locator (e.g., an URL or fixed IP address) of PS 112. Upon initiation or boot-up, the first communication attempt made by MS 102 is with this default PS 112.

Also located in the 3G1x provider's private network (although possibly not geographically near the PS) is a mobile switching center 114 (MSC), and 3G1x base station 116 (BS). As previously noted, WLAN 104 may or may not be physically overlaid by a 3G1x cell 118 corresponding to BS 116.

An interface construct 120 is connected to AP 106 via GTW 110, and also connects to MSC 114 via a standard 3G1x protocol (e.g., signaling (A1/A1$p$) and bearer (A2/A2$p$) interfaces). Construct 120 may be referred to as a universal base station controller (UBSC). UBSC 120 interprets modified 3G1x air interface messaging, and A1 signaling. UBSC 120 may also be capable of doing transcoding between encoded speech (e.g., EVRC, 13K) and 64-bit PCM. UBSC 120 may connect to a packet convergence function (PCF) or packet data serving node (PDSN) within the 3G1x network.

Generally, the present system utilizes standard signaling and bearer protocols to communicate. As described hereinafter, however, there are certain messages or signals that are modified from 3G1x signaling protocol. Referring now to FIGS. 2-6, various operational contexts for these communications are illustrated.

Figure 2:
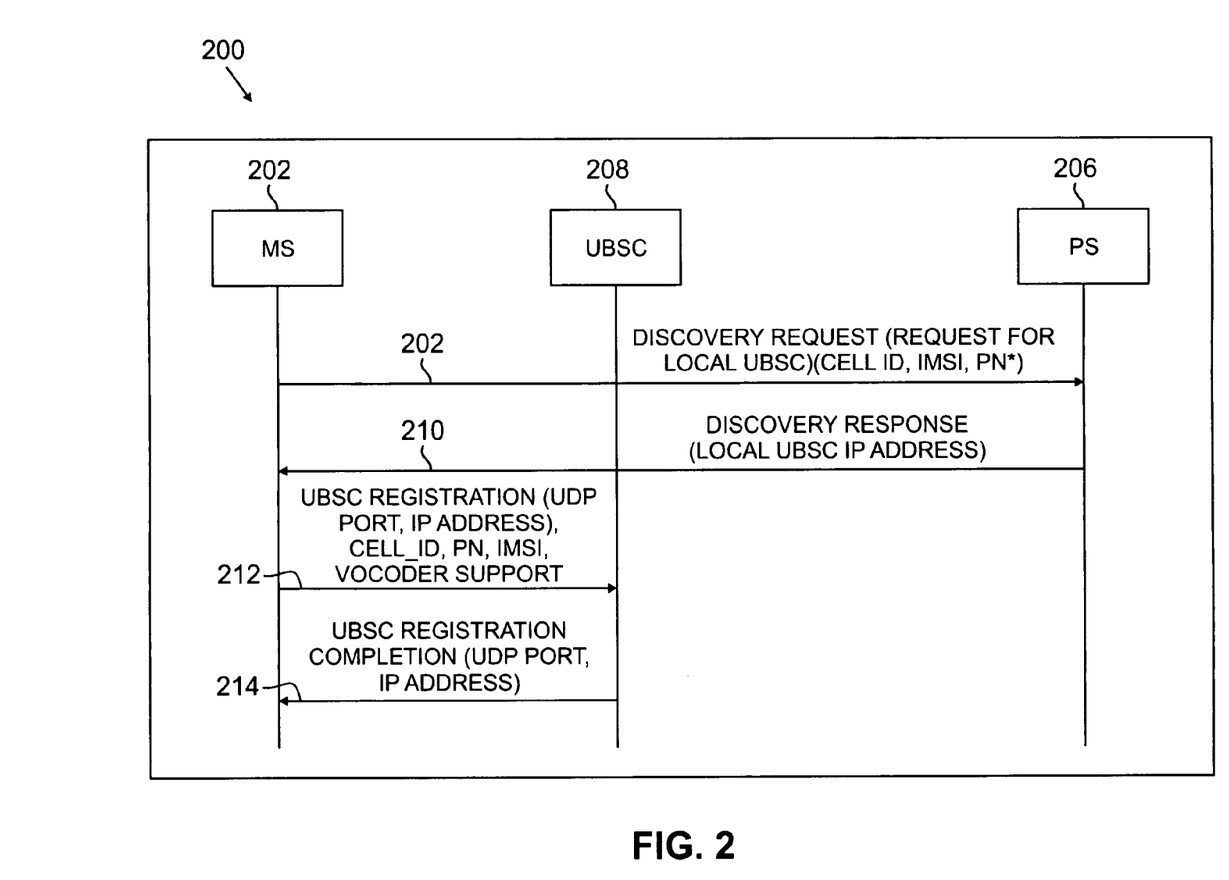
FIG. 2 depicts one embodiment of a system operation scenario according to certain aspects of the present disclosure.

Referring now to FIG. 2, diagram 200 depicts the relative timing and sequencing of certain communications in a situation where an MS 202 boots up within, and initiates access through, a WLAN environment. Before initiating access through the WLAN, MS 202 will search for any 3G1x BS pilot signals that it can detect. The MS then establishes a session on the WLAN, and obtains an IP address from the broadband provider's network. After MS 202 has gained access to the broadband network, it sends a discovery request message 204 to its provisioned IP address or URL for PS 206. Message 204 may comprise the MS's international mobile subscriber identity (IMSI) and—if it was able to detect any 3G1x BS pilot signals—identification data (e.g., Cell_Id) for 3G1x pilots in its area.

PS 206, upon receiving message 204, uses the identification data to assign a UBSC 208 covering the geographic area that includes the BS that MS 202 identified; and then returns a discovery response message 210 that contains the IP address for UBSC 208. PS 206 may assign a default UBSC if it did not receive any 3G1x pilot info from MS 202. UBSC 208 does need to be geographically located near the BS that covers MS 202.

Upon receipt of message 210, MS 202 sends a UBSC registration message 212 to UBSC 208. This message includes the MS's 3G1x observed pilot information (if available), the MS's IMSI, voice service options (i.e., vocoders) that the MS supports, and also a UDP Port and IP address that the MS will use for its endpoint of an RTP (real time protocol) connection for voice bearer. UBSC 208 stores the 3G1x pilot information and vocoder support information with the associated IMSI, and associates this IMSI with the UDP Port/IP Address pair it received from the MS. UBSC 208 then returns a UBSC registration completion message 214 that includes a UDP Port and IP address that UBSC 208 will use for its endpoint of an RTP connection for voice bearer.

Figure 3:
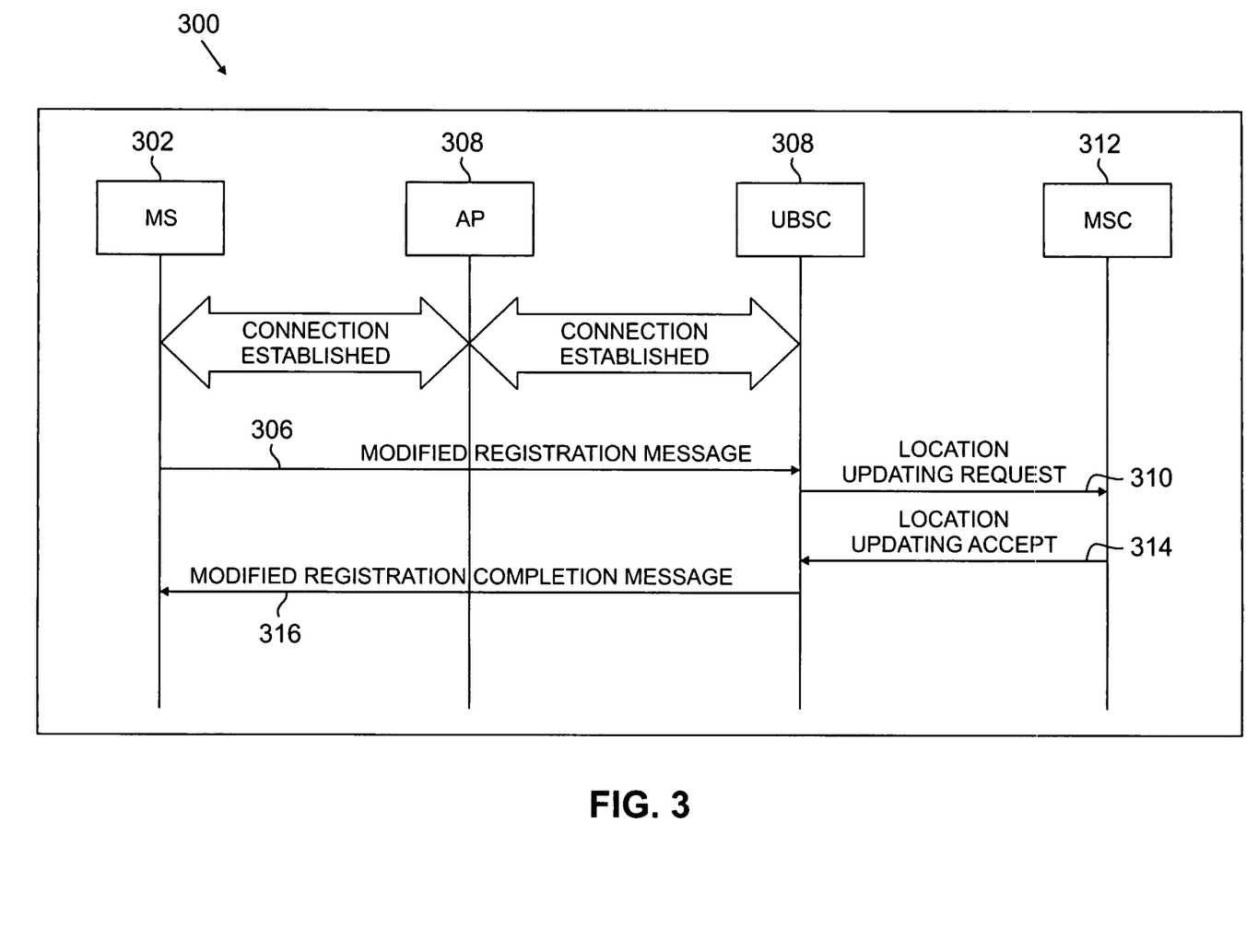
FIGS. 3-6 depicts other embodiments of system operation scenarios according to certain aspects of the present disclosure.

Referring now to FIG. 3, diagram 300 depicts the relative timing and sequencing of certain communications in a situation where—after an MS 302 establishes connection with a UBSC 304—it may use UBSC 304 to send/receive 3G1x messaging. MS 302 needs to register with a CDMA network to receive voice service. MS 302 sends a modified registration message 306 to UBSC 304 via a WLAN AP 308. Upon receipt of this message, UBSC 304 sends a location updating request message 310 to a serving MSC 312. MSC 312 responds with a location updating accept message 314, and UBSC 304 sends a modified registration completion message 316 to MS 302. At this point, MS 302 is registered for 3G1x voice service with the CDMA network.

Figure 4:
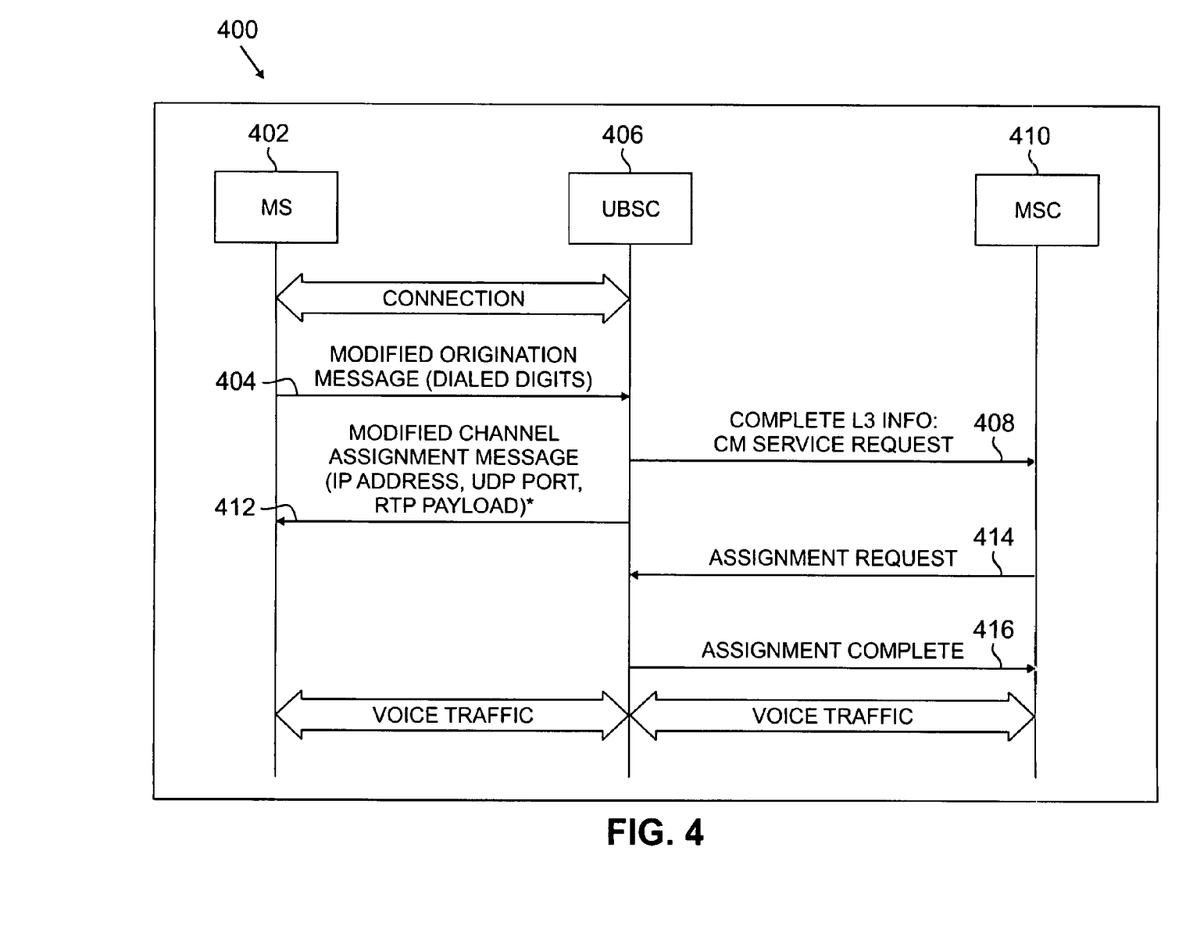

Referring now to FIG. 4, diagram 400 depicts the relative timing and sequencing of certain communications in a situation where—after an MS 402 has registered with a CDMA network for voice service—it originates a 3G1x voice call. MS 402 sends a modified origination message 404 to a UBSC 406 over its WLAN connection. UBSC 406 sends a CM service request message 408 to an MSC 410 over, for example, an A1 or A1$p$ interface. UBSC 406 also sends a modified channel assignment message 412 to MS 402. Since the WLAN is used as the air interface, no 3G1x channel needs to be assigned. UBSC 406 may include a different UDP Port and IP address to be used as its RTP endpoint for this call. Based on service option data that MS 402 included in message 404, and the capabilities of the UBSC, UBSC 406 will assign a vocoder type for the call, and include this in message 412 in the form of an RTP payload type.

MSC 410 sends an assignment request message 414 to UBSC 406, and UBSC 406 responds with an assignment complete message 416, containing the service option assigned for the call. MSC 410 may send call progress indications to MS 402. Upon connection with the called party, MS 402 can send encoded speech over the RTP connection established between MS 410 and UBSC 406. UBSC 406 either transcodes the speech to PCM and sends it to MSC 410 over an A2 circuit connection, or it sends the encoded speech to a media gateway over an A2$p$ connection. Voice traffic 418 is thus established.

Figure 5:
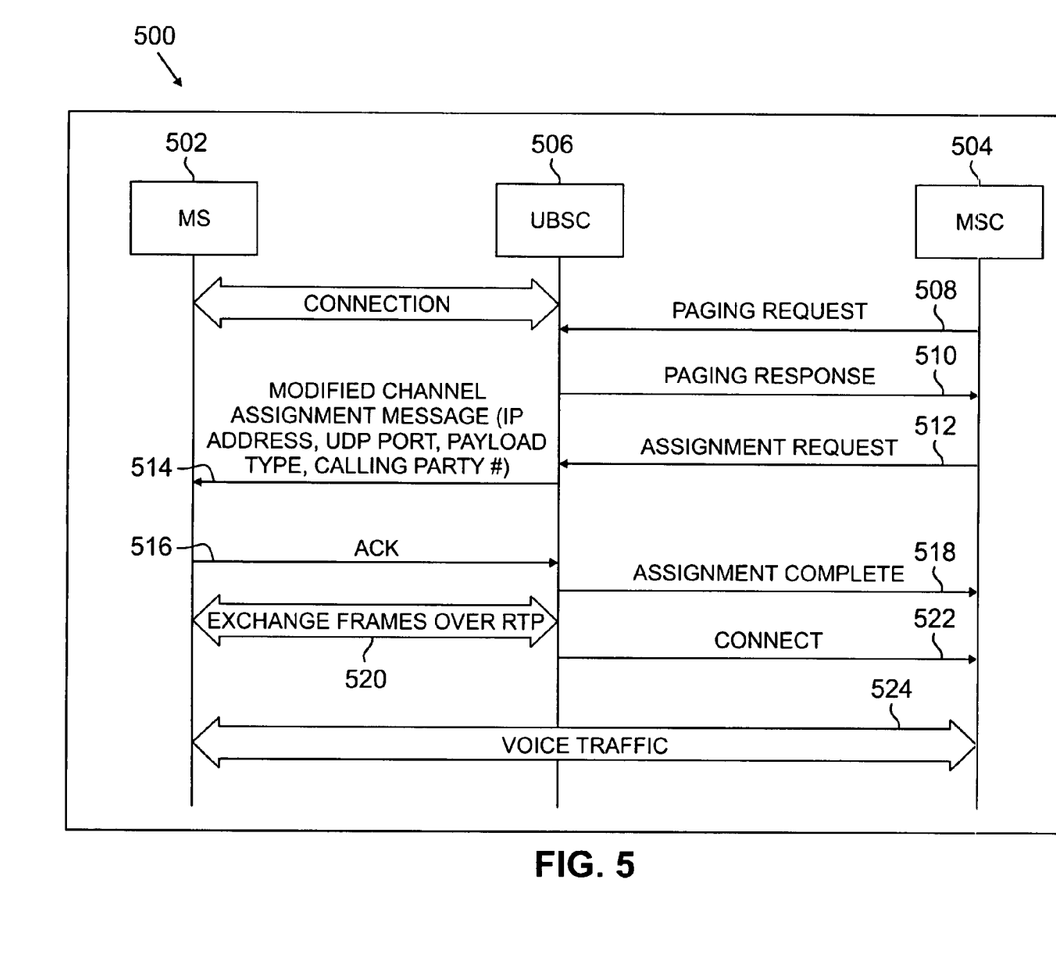

Referring now to FIG. 5, diagram 500 depicts the relative timing and sequencing of certain communications in a situation where—after an MS 502 has registered with a CDMA network for voice service—it may receive a 3G1x voice call. Since MS 502 has registered with an MSC 504, in-coming voice calls for the MS will be directed to a UBSC 506. MSC 504 sends a paging request message 508 to UBSC 506. Upon receipt of this message, UBSC 506 may immediately send a paging response message 510 to MSC 504—since MS 502 does not need to be paged if it has not moved from its WLAN network. UBSC 506 will set the service option to a default (8K) in this step. MSC 504 then sends an assignment request message 512 to UBSC 506. UBSC 506 sends a modified channel assignment message 514 to MS 502, using an IP address that MS 502 provided when it registered with UBSC 506. Message 514 may contain a new UDP Port/IP address pair to be used as the UBSC's RTP endpoint; or the UBSC may use the same UDP Port/IP Address pair it sent to MS 502 during the registration process.

Message 514 also comprises the calling party number (if received from the MSC), and the vocoder type to be used in the call, as indicated by the RTP payload type. MS 502 sends an Ack message 516 to indicate receipt of message 514, and UBSC 506 then sends an assignment complete message 518 to MSC 504, including the service option to be used for the call. MS 502 and UBSC 506 begin to exchange frames 520 over the RTP link, and UBSC 506 sends a connect message 522 to MSC 504. At this point, voice traffic 524 can flow between MSC 504 and MS 502.

Figure 6:
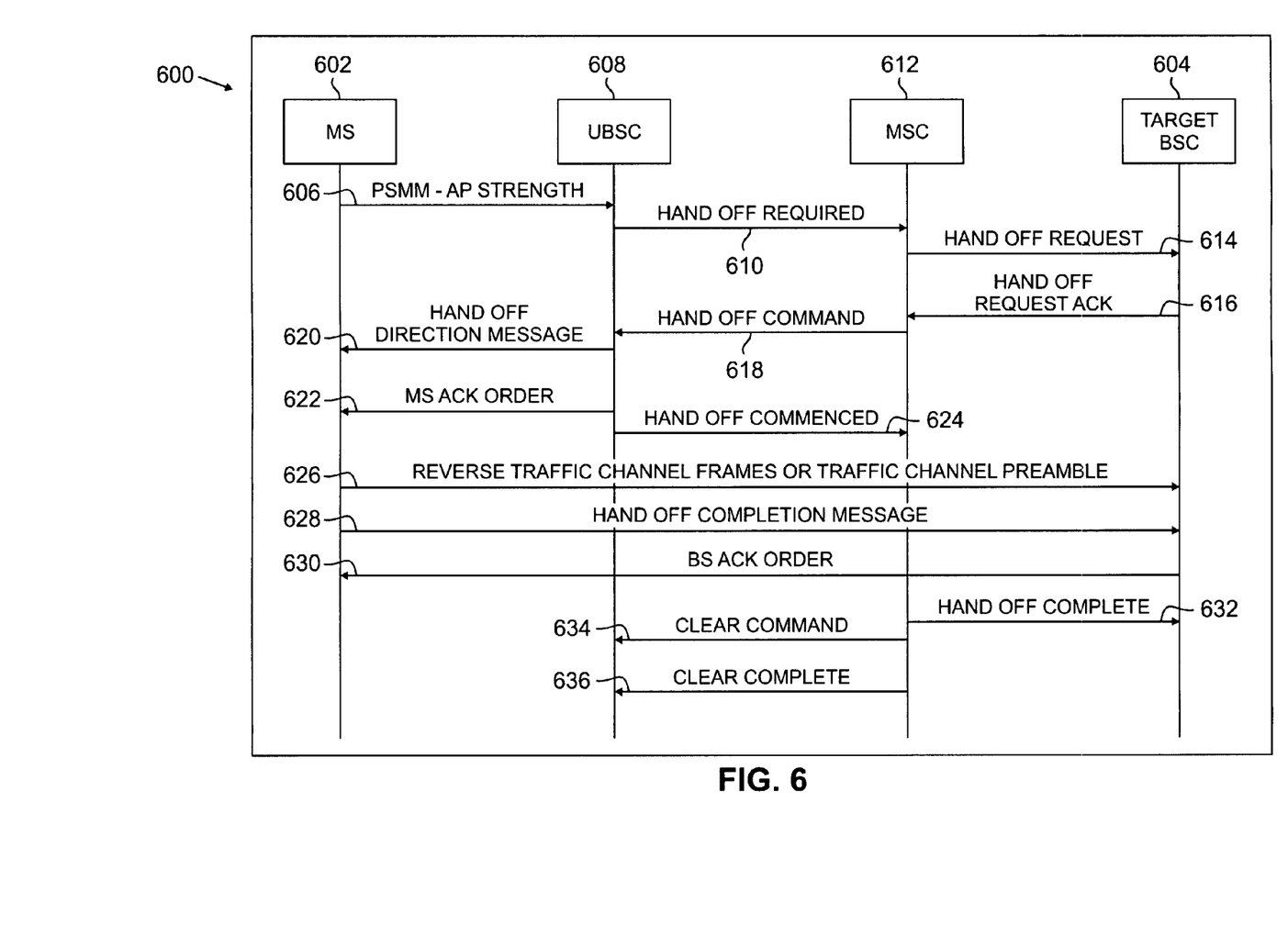

Referring now to FIG. 6, diagram 600 depicts the relative timing and sequencing of certain communications in a situation where—after an MS 602 is engaged on a 3G1x voice call on its WLAN network—a user moves outside the coverage area of the WLAN's AP. Where the WLAN is overlaid by a CDMA2000 network, the voice call may be handed off to a target 3G1x BS 604. MS 602 monitors the relative strength of the WLAN network pilot signal received from its AP. If that signal strength drops below a provisioned threshold for a configured amount of time, MS 602 may be configured to assume that the user is moving outside of the WLAN coverage area.

MS 602 sends a modified pilot strength measurement message 606 (PSMM) to its UBSC 608, containing no pilot data. If UBSC 608 received BS identification data (e.g., Cell_ID) from MS 602 upon registration, it can hand the call off to the 3G1x system. If not, UBSC 608 may send a warning message to MS 602 that WLAN coverage is being lost.

If UBSC 608 is able to hand the call off, it sends a handoff required message 610 to an MSC 612, including the BS identification data received from MS 602 upon its registration. MSC 612 sends a handoff request message 614 to BS 604 that controls the cell indicated. BS 604 sends a handoff request ack message 616 to MSC 612, including information needed to populate a universal handoff direction message (UHDM). MSC 612 passes this information to UBSC 608 using a handoff command message 618.

UBSC 608 codes a UHDM message 620 and sends it to MS 602 over its WLAN interface. Upon receipt of this message, MS 602 sends an MS ack order 622 to UBSC 608, and prepares to switch to the 3G1x system. After receiving order 622, UBSC 608 sends a handoff commenced message 624 to MSC 612. MS 602 tunes to its assigned 3G1x channel and begins sending reverse traffic frames 626, and the target BS 604 sends forward traffic frames. When MS 602 acquires its fundamental channel and begins receiving traffic frames from BS 604, it sends a handoff completion message 628 to BS 604. Upon receipt of this message, BS 604 sends a BS Ack order 630 to MS 602, and a handoff complete message 632 to MSC 612. MSC 612 sends a clear command 634 to UBSC 608, and UBSC 608 releases all information for MS 602 and sends a clear complete message 636 to MSC 612.

As noted above, many of the messages utilized may be of standard format, as provided by the incumbent CDMA2000 network. However, certain messages to or from the MS while it operates within a WLAN environment are of a modified format. Several examples of such modified messages are illustrated now in reference to FIGS. 7-10.

Figure 7:
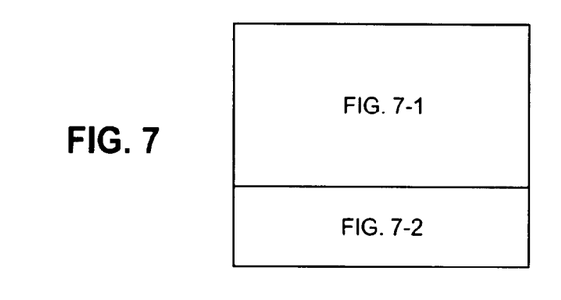
FIGS. 7-10 depicts several embodiments of a modified message fields according to certain aspects of the present disclosure.

Referring now to FIG. 7, illustrative portions of a discovery request message 700 are depicted. For purposes of illustration and explanation, these portions are depicted in a format compatible with messaging/signaling interfaces provided by applicable CDMA2000 standards and protocols. Request message 700 may comprise a number of fields for communicating operational data. One or more fields or segments that identify the mobile station may be provided. A first field 702 may be provided for communicating the mobile station's IMSI. In addition, or in the alternative, another field 704 may be provided for communicating the mobile station's electronic serial number (ESN) data. In addition, or in the alternative, another field 706 may be provided for communicating the mobile station's mobile equipment identifier (MEID) data. Depending upon the nature of the network and its constituent components, other identification fields may be provided in addition or in the alternative. In addition, fields 708 and 710 may be provided for communicating cell identification data, such as a Cell_ID value and Pilot PN code, respectively.

Figure 8:
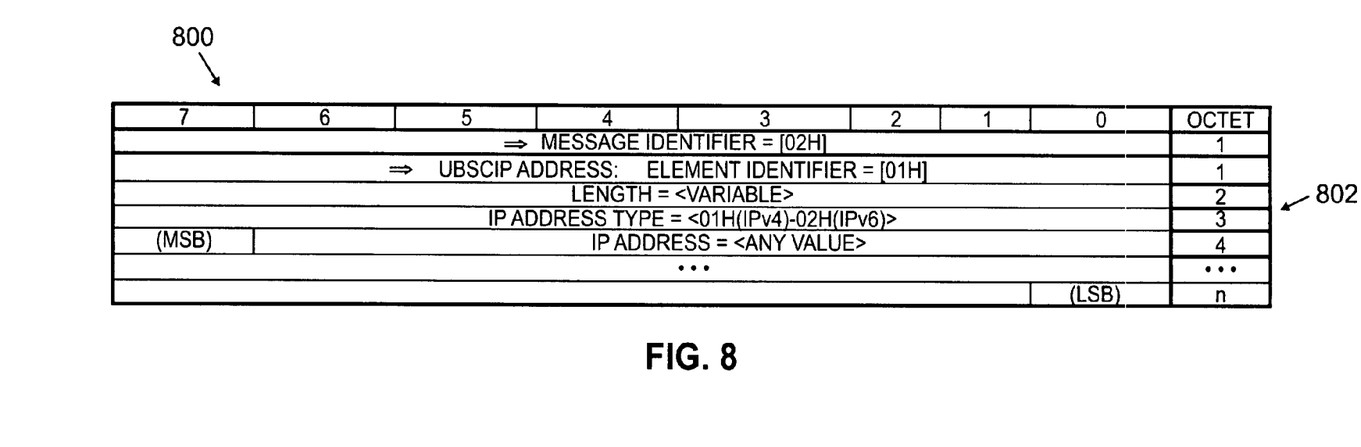

Referring now to FIG. 8, illustrative portions of a discovery response message 800 are depicted. Again, these portions are depicted in a format compatible with messaging/signaling interfaces provided by applicable CDMA2000 standards and protocols. Response message 800 may comprise a number of fields for communicating operational data. At least one field 802 is provided for communicating the IP address of a UBSC. Depending upon the nature of the network and its constituent components, other identification fields may be provided in addition or in the alternative.

Figure 9:
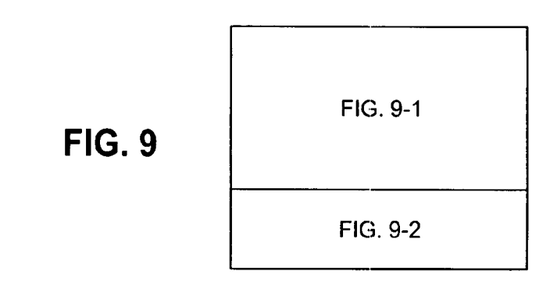

Referring now to FIG. 9, illustrative portions of a UBSC registration message 900 are depicted. Registration message 900 may comprise a number of fields for communicating operational data. One or more fields or segments that identify the mobile station may be provided. A first field 902 may be provided for communicating the mobile station's IMSI. In addition, or in the alternative, another field 904 may be provided for communicating the mobile station's electronic serial number (ESN) data. In addition, or in the alternative, another field 906 may be provided for communicating the mobile station's mobile equipment identifier (MEID) data. Depending upon the nature of the network and its constituent components, other identification fields may be provided in addition or in the alternative. In addition, fields 908 and 910 may be provided for communicating cell identification data, such as a Cell_ID value and Pilot PN code, respectively. Message 900 may further include field 912 for communicating RTP endpoint data—such as a session IP address or UDP port data—as well as field 914 for communicating data relating to the vocoders supported by the mobile station.

Figure 10:
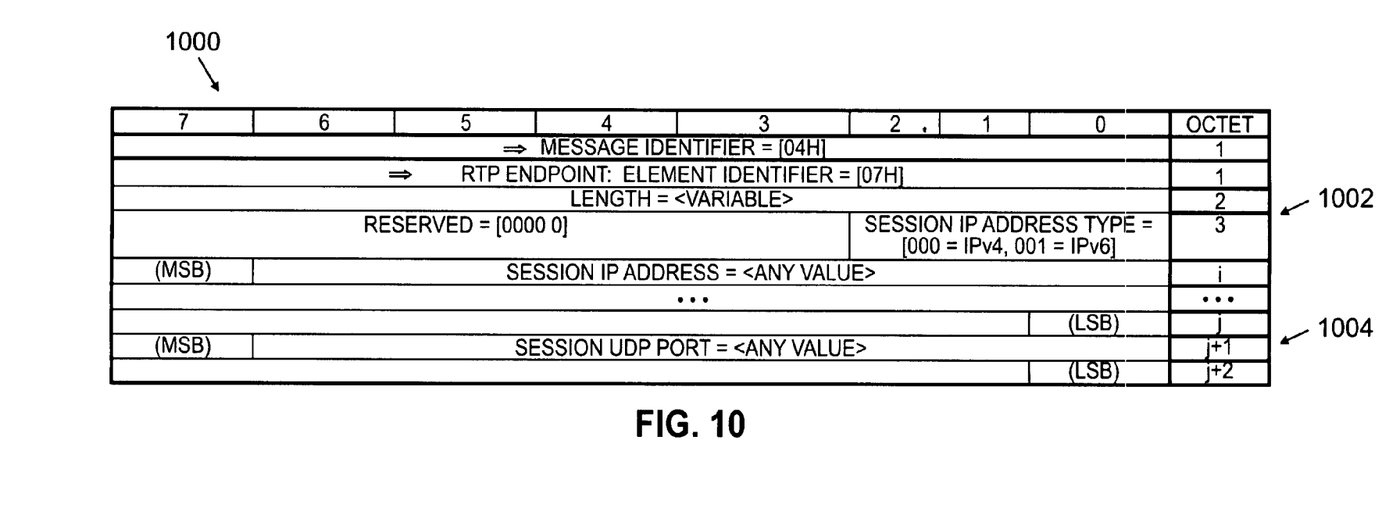

Referring now to FIG. 10, illustrative portions of a UBSC registration complete message 1000 are depicted. Message 1000 may comprise a number of fields for communicating operational data. A first field 1002 is provided for communicating the session IP address. A second field 1004 may be provided for communicating the session UDP port data. Depending upon the nature of the network and its constituent components, other identification fields may be provided in addition or in the alternative.

Thus, the system of the present disclosure provides both an architecture and a signaling protocol enabling the provision of CDMA2000 signaling over a WLAN—thereby providing CDMA services over basic WLANs. These services may be provided with nominal system overhead; adding only simple servers, hosted on a subscriber's network and accessible via the Internet, rather than utilizing expensive "dual-mode" base stations deployed in WLAN zones.

It should be apparent to those of skill in the art that the present disclosure is not limited solely to mobile handset devices. The present disclosure also encompasses other types of wireless voice or data devices (e.g., laptop computers, PDAs). It should therefore be understood that the use of the term "mobile station" in the claims and in the description is intended to encompass a wide range of mobile devices (e.g., cell phones, wireless laptops).

Although certain aspects of the present disclosure have been described in relations to specific systems, standards and structures, it should be easily appreciated by one of skill in the art that the system of the present disclosure provides and comprehends a wide array of variations and combinations easily adapted to a number of wireless communications system. As described herein, the relative arrangement and operation of necessary functions may be provided in any manner suitable for a particular application. All such variations and modifications are hereby comprehended. It should also be appreciated that the constituent members or components of this system may be produced or provided using any suitable hardware, firmware, software, or combination(s) thereof.

The embodiments and examples set forth herein are therefore presented to best explain the present disclosure and its practical application, and to thereby enable those skilled in the art to make and utilize the system of the present disclosure. The description as set forth herein is therefore not intended to be exhaustive or to limit any invention to a precise form disclosed. As stated throughout, many modifications and variations are possible in light of the above teaching without departing from the spirit and scope of the following claims.

What is claimed is:

1. A wireless communications system comprising:
    a mobile station configured to operate in a wireless LAN;
    a wireless LAN access point, through which the mobile station is configured to gain access to the Internet;
    a mobile switching center of a CDMA2000 over-the-air network;
    a universal base station controller (USBC) communicatively coupled between the mobile switching center and the wireless LAN, the USBC configured to facilitate call traffic between the CDMA2000 network and the mobile station over the wireless LAN; and
    a provisioning server, accessible via the Internet, the provisioning server configured to:
        receive identification data associated with a base station from the mobile station; and
        assign, using the received identification data, the USBC to be utilized by the mobile station according to a geographic area of the USBC relative to the geographic area of the base station that covers the mobile station, the USBC remotely configured from the base station, and wherein the mobile station is configured to be pre-loaded with a locator for the provisioning server.

2. The system of claim 1, wherein the wireless LAN is aligned with IEEE 802.11 standards.

3. The system of claim 1, wherein the wireless LAN is aligned with Bluetooth technology.

4. The system of claim 1, wherein the CDMA2000 network comprises a 3G1x network.

5. The system of claim 1, wherein the USBC is configured to be coupled to a mobile switching center in the CDMA2000 network.

6. A method of accessing a CDMA2000 over-the-air network from a mobile station using a wireless LAN, the method comprising:
    searching, using a mobile station, for base station pilot signals from the CDMA2000 network, the CDMA2000 network comprising a mobile switching center;
    establishing access to the Internet, for the mobile station, through the wireless LAN;
    sending identification data associated with a base station from the mobile station to a predetermined provisioning server;
    assigning, using the provisioning server, a universal base station controller (USBC) to be utilized by the mobile station according to a geographic area of the USBC relative to the geographic area of the base station, the USBC communicatively coupled between the mobile switching center and the wireless LAN, the USBC configured to facilitate call traffic between the CDMA2000 network and the mobile station over the wireless LAN, the USBC configured remotely from the base station, and wherein the mobile station is configured to be pre-loaded with a locator for the provisioning server; and
    registering the mobile station with the USBC.

7. The method of claim 6, wherein the wireless LAN is aligned with IEEE 802.11 standards.

8. The method of claim 6, wherein the wireless LAN is aligned with Bluetooth technology.

9. The method of claim 6, wherein the CDMA2000 network comprises a 3G1x network.

10. The method of claim 6, wherein establishing access to the Internet for the mobile station further comprises utilizing an Internet gateway device.

11. The method of claim 6, wherein sending identification data from the mobile station to the predetermined provisioning server comprises sending a discovery request message.

12. The method of claim 6, wherein registering the mobile station with the USBC comprises sending a UBSC registration message.

13. A method of providing, for a mobile station, efficient interworking of wireless LAN and CDMA2000 networks, the method comprising:
    providing a mobile station within a wireless LAN network;
    establishing an Internet connection for the mobile station via the wireless LAN network;
    contacting, via the Internet, a provisioning server within a CDMA2000 network;
    identifying the mobile station, and data on base station pilot signals near the mobile station, to the provisioning server;
    utilizing the provisioning server to assign a universal base station controller (USBC) to the mobile station according to a geographic area of the USBC relative to the geographic area of the mobile station, the USBC communicatively coupled between a mobile switching center of the CDMA2000 network and the wireless LAN network, the USBC configured remotely from a base station associated with the base station pilot signals, and wherein the mobile station is configured to be pre-loaded with a locator for the provisioning server;
    registering the mobile station with the USBC; and routing, through the USBC, call traffic between the mobile station and the CDMA2000 network over the wireless LAN network.

14. The method of claim 13, wherein contacting the provisioning server utilizes a default IP address or URL programmed within the mobile station.

15. The method of claim 13, wherein the USBC is communicatively coupled to an access point of the wireless LAN network through a gateway and is configured to connect to the mobile switching center via a standard 31Gx protocol, wherein the USBC communicates with the mobile station through the access point and the gateway.

16. The method of claim 13, wherein routing call traffic comprises transmitting a modified origination message from the mobile station to the universal base station controller.

17. The method of claim 13, wherein routing call traffic comprises transmitting a modified channel assignment message from the universal base station controller to the mobile station.

18. The method of claim 13, further comprising initiating handoff of the mobile station to the CDMA2000 network after access point signal strength in the wireless LAN decreases excessively.

19. The method of claim 18, wherein initiating handoff of the mobile station further comprises transmitting a pilot strength measurement message from the mobile station to the universal base station controller.

20. The system of claim 1, wherein the identification data comprises a discovery request message.

\* \* \* \* \*